US008892288B2

(12) United States Patent
Derflinger et al.

(10) Patent No.: US 8,892,288 B2
(45) Date of Patent: Nov. 18, 2014

(54) METHOD AND DEVICE FOR CONTROLLING THE DRIVE TRAIN OF AN ELECTRIC VEHICLE

(71) Applicant: Ford Global Technologies, LLC, Dearborn, MI (US)

(72) Inventors: Monika Derflinger, Aachen (DE); Arnulf Sponheimer, Aachen (DE); Roger Graaf, Vaals (NL); Marc Simon, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 13/736,103

(22) Filed: Jan. 8, 2013

(65) Prior Publication Data

US 2014/0195079 A1    Jul. 10, 2014

(51) Int. Cl.
*B60L 15/20* (2006.01)
*B60L 11/12* (2006.01)

(52) U.S. Cl.
CPC .......... B60L 15/2054 (2013.01); B60L 11/123 (2013.01); B60L 15/2045 (2013.01); *B60L 2220/42* (2013.01); *B60L 2240/12* (2013.01); *B60L 2240/14* (2013.01); *B60L 2240/421* (2013.01); *B60L 2240/423* (2013.01); *B60L 2260/28* (2013.01); *Y10S 903/916* (2013.01); *Y10S 903/945* (2013.01); *Y10S 903/946* (2013.01)
USPC ................. 701/22; 701/69; 701/84; 701/87; 701/90; 903/916; 903/945; 903/946; 180/65.1; 180/65.21; 180/65.235; 180/65.51; 180/65.6; 180/65.7

(58) Field of Classification Search
CPC ....... B60K 1/00; B60K 17/356; B60W 10/00; B60W 10/08; B60W 10/113; B60W 10/119; B60W 10/14; B60W 10/16; B60W 50/38; B60W 20/00; B60L 11/123; B60L 15/2045; B60L 2220/42; B60L 2240/12; B60L 2240/14; B60L 2240/421; B60L 2240/423; B60L 2260/28; B60L 15/2054
USPC .............. 701/22, 69, 84, 87, 90, 88; 903/916, 903/945–946; 180/65.1, 65.21, 65.235, 180/65.51, 65.6, 65.7
See application file for complete search history.

(56) References Cited

U.S. PATENT DOCUMENTS

| | | | | |
|---|---|---|---|---|
| 5,841,201 A | * | 11/1998 | Tabata et al. ................. | 290/40 C |
| 6,892,128 B2 | * | 5/2005 | Asakawa et al. .............. | 701/103 |
| 7,115,064 B2 | * | 10/2006 | Masterson et al. ................. | 477/3 |
| 7,407,026 B2 | * | 8/2008 | Tamor ......................... | 180/65.28 |

(Continued)

FOREIGN PATENT DOCUMENTS

FR            2891963 A1 *   4/2007

*Primary Examiner* — James Trammell
*Assistant Examiner* — Atul Trivedi
(74) *Attorney, Agent, or Firm* — David M. Kelley; MacMillan, Sobanski & Todd, LLC

(57) ABSTRACT

A method for controlling an electric vehicle drivetrain having least two drive units with wheels located on opposite axles are driven by respective drive units, includes in a first operating mode, the ratio of the torques provided by the drive units in each case for a given torque requirement is set taking into account the efficiency applicable to each drive unit under the given operating conditions, and in a second operating mode, the ratio of the torques provided by the drive units in each case for a given torque requirement is set independently of the efficiency applicable to each drive unit under the given operating conditions.

14 Claims, 1 Drawing Sheet

(56) References Cited

U.S. PATENT DOCUMENTS

| | | | |
|---|---|---|---|
| 2004/0173393 A1* | 9/2004 | Man et al. | 180/65.2 |
| 2005/0003926 A1* | 1/2005 | Hanada et al. | 477/3 |
| 2005/0003927 A1* | 1/2005 | Asakawa et al. | 477/3 |
| 2005/0003928 A1* | 1/2005 | Niki et al. | 477/5 |
| 2005/0101432 A1* | 5/2005 | Pels et al. | 477/5 |
| 2005/0211479 A1* | 9/2005 | Tamor | 180/65.2 |
| 2005/0256623 A1* | 11/2005 | Hubbard et al. | 701/54 |
| 2008/0314661 A1* | 12/2008 | Soliman et al. | 180/65.4 |
| 2008/0318728 A1* | 12/2008 | Soliman et al. | 477/4 |
| 2010/0252342 A1* | 10/2010 | Jordan | 180/65.22 |
| 2011/0196586 A1* | 8/2011 | Inoue | 701/58 |
| 2012/0196713 A1* | 8/2012 | He et al. | 475/5 |
| 2012/0197472 A1* | 8/2012 | He et al. | 701/22 |

\* cited by examiner

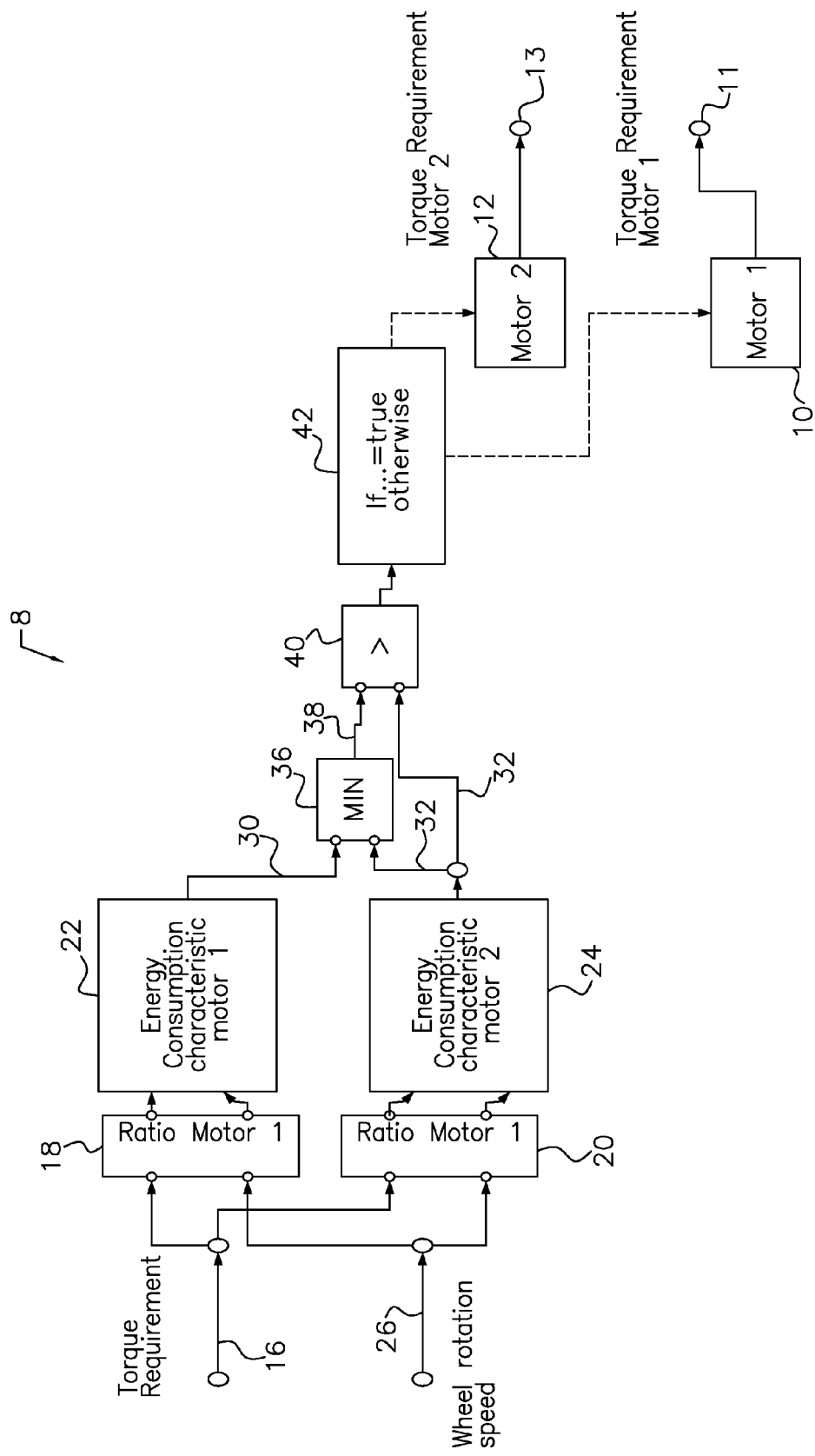

METHOD AND DEVICE FOR CONTROLLING THE DRIVE TRAIN OF AN ELECTRIC VEHICLE

BACKGROUND OF THE INVENTION

1. Field of the Invention

This invention relates generally to controlling the drive train of an electric vehicle.

2. Description of the Prior Art

To increase the range of an electric vehicle, it is particularly important for the drive train to work as efficiently as possible. In a conventional drive train, the traction or electric motor and the transmission are designed such that both the requirements for performance of the electric vehicle and the requirements for efficient energy utilization are fulfilled.

Whereas the performance criteria, i.e. the criteria regarding performance of the drive train, in an exclusively electrically driven motor vehicle require high torque and power values, the typical drive cycle of an electric vehicle takes place in the low torque and low rotation speed range, since in typical urban drive cycles and homologation cycles, the electric motor is usually operated with a comparatively low power and torque profile.

In this low load range, however, a conventional electric motor has low efficiency. To achieve higher efficiencies of the drive train in a typical urban drive cycle and in typical homologation cycles, the design of the electric motor must have nominal values for power and torque corresponding to the respective load cycle. However in these cases, the performance criteria are not fulfilled as these performance criteria require higher nominal values for torque and power.

Designing the electric motor to have the optimum operating or working point in the homologation cycle load path, therefore, leads to a lower starting torque at high engine speeds, which in turn has the consequence that the electric motor is no longer able to deliver sufficiently high torque on a hill start or in scenarios with high rotation speed.

JP 2005161961 A discloses, in a hybrid electric vehicle, by means of an electronic hybrid control unit, increasing the torque distributed to the rear axle relative to the torque distributed to the front axle, in particular on occurrence of irregularities in operation of the electronic brake control, in order to further guarantee a functioning all-wheel drive.

US 2006/0151220 A1 discloses a vehicle with individually electrically driven wheels, wherein the rotation axes of the rotating electric machines used are offset relative to those of the individually electrically driven wheels in order to achieve an increase in drive power without increasing the radial or axial length of the machines.

U.S. Pat. No. 6,549,840 B1 discloses a vehicle control unit to control a motor vehicle with all-wheel drive, by means of which a front drive power to drive the pair of front wheels and a rear drive power to drive the pair of rear wheels are controlled as a function of a static and a dynamic vehicle state such that the sum of the front drive power and the rear drive power is equal to the value of the vehicle drive power desired by the driver.

SUMMARY OF THE INVENTION

A method for controlling an electric vehicle drivetrain having least two drive units with wheels located on opposite axles are driven by respective drive units, includes in a first operating mode, the ratio of the torques provided by the drive units in each case for a given torque requirement is set taking into account the efficiency applicable to each drive unit under the given operating conditions, and in a second operating mode, the ratio of the torques provided by the drive units in each case for a given torque requirement is set independently of the efficiency applicable to each drive unit under the given operating conditions.

The control method provides a higher efficiency of the drive train in typical operating cycles and high performance of the drive train where necessary.

In a first operating mode the ratio of the torques provided by the drive units in each case for a given torque requirement is set taking into account the efficiency applicable to each drive unit under the given operating conditions. In a second operating mode the ratio of the torques provided by the drive units in each case for a given torque requirement is set independently of the efficiency applicable to each drive unit under the given operating conditions.

The drive units can be designed or scaled for different target load values and operated in cascade. The use of a multiplicity of drive units according to the invention thus replaces a conventional drive train in an electric vehicle which is characterized by an inverter, an electric traction motor and a gearbox with fixed translation ratio.

In operating cycles with operation under low load, the electric vehicle can be driven with a maximum efficiency which allows a long journey or long range driving. In the case of an acceleration, on a hill start or when driving at high speed, at least one drive unit can be activated on a further vehicle axle which leads to optimum performance properties.

As a result by means of the novel design of the drive train in an electric vehicle, the range of the electric vehicle can be substantially increased. To the same extent, the amount of necessary battery capacity can be reduced. This leads to a substantially higher usage benefit since with a single charge, a greater range can be achieved and the operating costs can be reduced.

For preferred embodiments and benefits of the device, reference is made to the statements made above in connection with the method.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 1 is a schematic block diagram showing a control algorithm for an electric vehicle.

DESCRIPTION OF THE PREFERRED EMBODIMENT

According to the embodiment example, the drivetrain in an electric vehicle includes at a first drive unit 10 (motor 1), which is drivable connected to the wheels of a first vehicle axle 11, such as the front axle, and a second drive unit 12 (motor 2), which is drivable connected to the wheels of a second vehicle axle 13, such as the rear axle.

In a typical operating mode of the electric vehicle, e.g. urban driving, for a pre-specified torque requirement and for the respective applicable rotation speed, the energy consumption characteristics of both drive units 10, 12 are determined. The torque to be generated is distributed depending on which of the drive units has the more favorable efficiency for the operating parameters concerned so that the drive units are each operated at their optimum efficiency.

Preferably the drive units 10, 12 are designed such that they can be decoupled from the drive train in the deactivated state. This can be achieved, for example, by fitting (i) a coupling device to the respective drive unit, whereby the mechanical connection with the wheel axle can be released by means of this coupling device, or (ii) an asynchronous electric traction machine (ASM) or (iii) a separately excited synchronous motor without induced slip moment can be used.

For the purpose of taking into account different efficiency characteristics of the drive units, the drive train is controlled such that the drive units are operated at their optimum efficiency in that the torque distribution between the drive units is optimized.

The drive units 10, 12 used according to the invention can take the form of four "in-wheel motors" or "near-wheel motors." Furthermore the drive units 10, 12 can also comprise two "in-wheel motors" and one axle motor or also two axle motors, of which one is arranged on the front axle and the other on the rear axle.

The operator demanded traction force and vehicle speed operate through a torque distribution algorithm 8 to provide a source or sources of electric power that are connected to the drive unit 10 on the front axle and the drive unit 12 on the rear axle. The torque distribution algorithm 8 can operate the drive units 10, 12 on the front axle and rear axle at their respective optimum efficiencies.

The control algorithm 8 includes producing a signal 16 representing the magnitude of wheel torque currently demanded by the vehicle operator. Signal 16 is supplied through ratio motors 18, 20 as input to sources of information 22, 24 containing energy consumption characteristics of drive units 10 and 12, respectively.

A signal 26 representing the magnitude of current wheel speed is also supplied through the ratio motors 18, 20 as input to the sources of information 22, 24 containing energy consumption characteristics of drive units 10 and 12, respectively.

Signals 30, 32 representing the expected energy consumption of each drive unit 10, 12 at the current demand conditions of wheel speed and wheel torque are supplied as input to a step 36, where the magnitude of minimum energy consumption output by the sources of information 22, 24 containing energy consumption characteristics is represented by a signal 38.

At step 40 a test is performed to determine whether the magnitude of energy consumption represented by signal 38 is less than that represented by signal 32.

If the result of test is logically true and if one of the drive units 10, 12 can meet or exceed the current demanded wheel torque, electric power is supplied to the selected drive unit, at step 42.

Algorithm 8 identifies the most efficient drive unit 10, 12, i.e. that drive unit having the greatest efficiency when producing the demanded wheel torque at the corresponding wheel speed. Motor torque requested by the vehicle operator is distributed to the selected drive unit 10, 12.

The control algorithm 8 can also generate the traction forces generated in the vehicle both in a firmly calibrated ratio and according to a power-based or efficiency-based torque distribution.

Each individual drive unit 10, 12 can be scaled down or operated less strongly with regard to its nominal values of torque and power in order to shift the most efficient operating point to lower values in the homologation or urban drive load range.

In an operating mode oriented towards optimum performance of the drive train, both drive units 10, 12 are active wherein the corresponding total demanded wheel torque and power are produced by both drive units in order to fulfill the performance requirements.

According to the invention several drive units 10, 12 are provided in an electric vehicle so that in comparison with a conventional drive train of an electric vehicle, which is designed for high power and high torque, the drive train has an improved efficiency in typical low load cycles, such as homologation or urban operating cycles. In operation with high performance, all drive units 10, 12 can be activated to drive the electric vehicle in order to provide required high values for power and torque.

In accordance with the provisions of the patent statutes, the preferred embodiment has been described. However, it should be noted that the alternate embodiments can be practiced otherwise than as specifically illustrated and described.

The invention claimed is:

1. A method for controlling a vehicle drivetrain, comprising:
   in a first operating mode, a ratio of propulsion torques provided by an electric first drive unit and an electric second drive unit in each case for a given propulsion torque requirement is set upon to taking into account efficiency applicable to each of the drive units under current operating conditions, the first drive unit only providing torque to a first axle and the second drive unit only providing torque to a second axle; and
   in a second operating mode, the ratio of propulsion torques provided by the drive units in each case for a given propulsion torque requirement is set independently of efficiency applicable to each of the drive units under the current operating conditions.

2. The method as claimed in claim 1, further comprising: determining, for the first operating mode, the drive unit which has a maximum efficiency under the given operating conditions.

3. The method as claimed in claim 1, further comprising deactivating one of the drive units in the first operating mode.

4. The method as claimed in claim 3, wherein the drive unit is decoupled from the drive train while the drive unit is deactivated.

5. The method as claimed in claim 1, wherein, in the second operating mode, power provided by the drive units is maximized.

6. The method as claimed in claim 1, wherein the second operating mode is selected during launching the vehicle on an ascending grade.

7. The method as claimed in claim 1, wherein the second operating mode is selected when vehicle speed exceeds a reference speed.

8. A method for controlling a vehicle drivetrain, comprising:
   in a first operating mode, employing a propulsion torque ratio between an electric motor only providing torque to an axle and a second electric motor only providing torque to a second axle, accounting for efficiency for each motor under current operating conditions;
   in a second operating mode, employing a second propulsion torque ratio between the motors independently of efficiency of each motor under current operating conditions.

9. The method of claim 8 further comprising:
determining, for the first operating mode, the motor which has a maximum efficiency under the current operating conditions.

10. The method of claim 8, further comprising deactivating one of the motors in the first operating mode.

11. The method of claim 10, wherein the deactivated motor is decoupled from the drivetrain while the deactivated motor remains deactivated.

12. The method of claim 8, wherein, in the second operating mode, power provided by the motors is maximized.

13. The method of claim 8, wherein the second operating mode is selected during launching the vehicle on an ascending grade.

14. The method of claim 8, wherein the second operating mode is selected when vehicle speed exceeds a reference speed.

\* \* \* \* \*